J. G. DAVIS.
Candle Mold.
No. 7,559.
Patented Aug. 13, 1850.
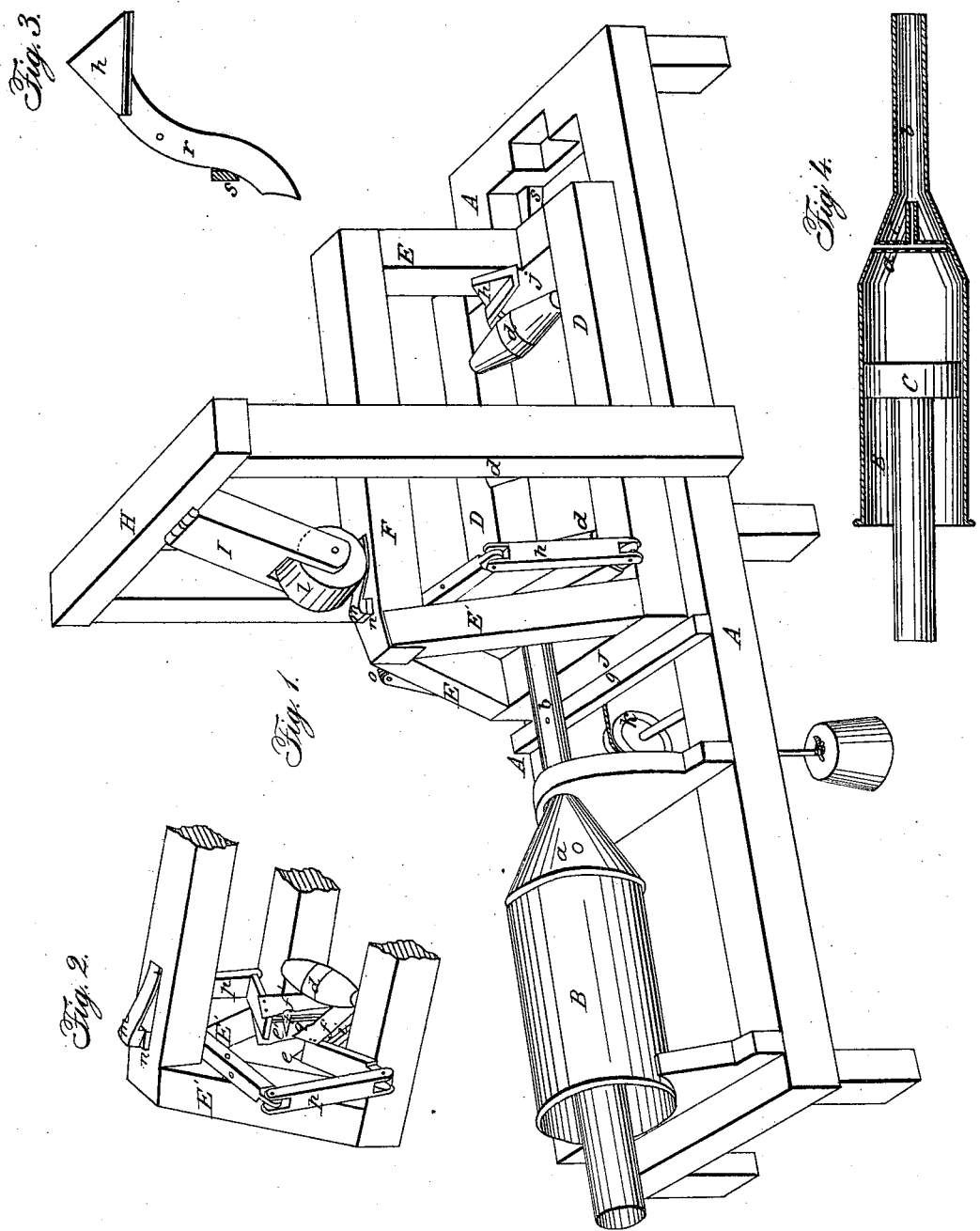

UNITED STATES PATENT OFFICE.

JAMES G. DAVIS, OF BUFFALO, NEW YORK, ASSIGNOR TO A. B. WARNER AND JAS. G. DAVIS.

MANUFACTURE OF CANDLES.

Specification of Letters Patent No. 7,559, dated August 13, 1850.

*To all whom it may concern:*

Be it known that I, JAMES G. DAVIS, of Buffalo, in the county of Erie and State of New York, have invented certain new and useful Improvements in the Manufacture of Tallow and Other Candles, of which the following is a full, clear, and exact description, reference being had to the accompanying drawings, which form part of this specification and in which Figure 1 represents a view in perspective of my machine, Fig. 2 is a similar view of a portion of the carriage, Fig. 3 is an elevation of the discharger and Fig. 4 is a section of the fat compressing cylinder.

The candles made by my machine have the form of a cylinder terminating at one end with a short piece of wick which projects beyond the cylinder to admit of the candle being more readily lighted. My machine consists of a cylinder fitted with a piston by means of which the fatty material of which the candles are made is forced through a cylindrical tube in the center of which the wick is fed; as the cylinder issues from the tube it is received upon a carriage furnished at the extremity nearer the end of the tube with a set of knives; as the issuing cylinder strikes the further extremity of the carriage these knives sever the piece laying upon it from the continuous cylinder issuing from the tube, and at the same time remove the fatty material from a portion of the wick leaving the latter bare. The candle being thus finished is thrown off from the carriage and the latter being returned by a weight or otherwise to its first position again receives the cylinder issuing from the tube to form a second candle.

The various members which act to form the candle are mounted upon a frame or bench, the side rails A A of which form the track on which the carriage traverses. The compressing cylinder B is secured at one extremity of the frame, it is open at one end and is fitted at the other with a conical head *a* terminating in a cylindrical tube *b* equal in diameter with that of the candle to be made. A tubular T shaped wick feeder *c* is secured within the conical head, the axis of the stem of the feeder being in line with that of the tube *b*. The cylinder is fitted with a piston C which is forced into its barrel by power applied either directly or by means of any suitable mechanical device.

The carriage consists of a rectangular frame D, mounted upon flanged wheels which run upon the rails A A of the main frame and retain the carriage in its proper position. The side pieces of the carriage are connected by rollers *d*, the uppermost portions of their barrels being in line with the lowermost portion of the tube *b*, thus forming a bed to receive and support the issuing cylinder. A standard E is erected at one end of this frame and a pair of converging standards E′ are erected at its front end, these three support an upper bar F extending the length of the lower frame.

A set of knives is hinged to the front cross bar of the carriage; this set consists of three pairs of knives *e e′, f f′, i i′*, the corresponding ones of each pair being connected so that all will act simultaneously; two pairs *e e′, f f′*, of these knives cut transversely to the prolonged axis of the tube, *b*, and are arranged at a distance from each other equal to the length of the piece of wick which is to be left projecting beyond the rest of the candle; the pair (*e e′*) nearer the tube cut through both the fat and wick; the pair further off cut through the fat alone, notches being made in their edges to receive the wick. The third pair of knives (*i i′*) act at right angles to the two others; they are secured to the others, and when nearest together are on opposite sides of the prolonged axis of the tube *b*; when the other knives sever the fat these enter the short cylinder included between the other pairs, and cutting up to the wick split the short cylinder in two halves which are easily removed thus leaving the wick bare.

The carriage is constructed to move a certain distance upon the rails, the limit of the forward motion being a stop *g* secured transversely to the rails, and the limit of the backward motion being the hindermost cross bar of the frame. The carriage is forced backward by the end of the cylinder issuing from the tube *b* striking against a discharger *h* pivoted to the cross bar *j*, it is drawn forwards by a weight acting through the intervention of a cord, passed over a sheave *k* and made fast to the front cross bar *j′*. The motion thus communicated to the carriage is made the means of operating the knives. In order to accomplish this, a gallows frame H is erected upon the side rails A, and an arm I is hinged by the front edge of its squared upper extremity to the cross bar of this frame; the lower extremity f this arm is fitted with a friction roller $l$ which, when the arm hangs vertically, runs upon the upper bar F of the carriage, the latter has a treadle $m$ let into its upper surface, its hinder extremity being pivoted in the bar while its front extremity rests upon the upper end of a piston $n$ which is passed through a socket in the bar and rests at its lower extremity upon the adjoining extremities of a pair of levers $o$ which are pivoted to the standards E' and project in opposite directions from the central plane of the carriage, the outer extremities of these levers are connected by links $p$ with the shanks of the knives, the construction of the several parts of the device being such that when the front end of the treadle is depressed, it, acting through the piston, levers, and links will force the knives to cut the cylinder lying upon the carriage between them; the opening of these knives and consequent raising of the treadle is effected by a pair of springs $q$.

The discharger at the hinder extremity of the carriage is pivoted to the cross bar $j$, its shank $r$ projects downward and bears against the rail A whose inner face at its under extremity is fitted with an inclined block $s$ on the face of which the shank slides, thus raising that portion of the discharger, upon which the hinder end of the candle rests, sufficiently to throw the candle clear of the hinder standard.

Candles are manufactured with this machine in the following manner: The fat, tallow for example, is introduced into the cylinder B and the end from a ball of wick is introduced through the open end of the cross bar of the wick holder; the piston is then entered in the cylinder and sufficient power is applied to it to compress the tallow and force it to issue in the form of a cylinder through the tube, carrying along with it as it issues the wick which is fed into its center through the wick holder. The cylinder issuing from the tube enters between the open knives and is received upon the rollers along which it glides until its extremity strikes against the discharger; the further movement of the cylinder then forces the carriage backwards; as the latter moves, the roller $l$ with the lower extremity of the arm I is carried with it until it jams in a vertical position by its upper squared extremity striking the lower face of the cross bar of the gallows frame. As the carriage moves on, the treadle passing beneath the roller is depressed and acting upon the knives forces their edges into the cylinder, the front pair $e$ $e'$ severing the portion on the carriage from the rest, the hinder pair $f$ $f'$, cutting the tallow up to the wick, and the intermediate pair $z'$, $z'^1$ splitting the short cylinder of tallow between the two other pairs so that it may be easily removed. By the continued movement of the carriage the treadle passes the roller and the springs withdraw the knives, the shank of the discharger now sliding against the inclined face of the block $s$ throws the hinder end of the candle clear of the standard of the carriage, and the carriage is immediately drawn back to its first position by the action of the weight; as it moves forward, the raised front extremity of the treadle strikes the roller, and the arm yielding to the pressure turns forward upon its hinge and allows the treadle to pass, when it resumes its original position.

Having thus described my invention, what I claim therein as new and desire to secure by Letters Patent is—

1. The arrangement and manner of operating the knives by which the cylinder of fat with its central wick is cut into suitable lengths for candles, and the fat removed from the end of the wick.

2. I also claim the devices for regulating the length, and delivering the candles, substantially as herein described.

In testimony whereof I have hereunto subscribed my name.

JAS. G. DAVIS.

Witnesses:
P. H. WATSON,
E. S. RENWICK.